United States Patent [19]

Bonazoli et al.

[11] 3,753,039

[45] Aug. 14, 1973

[54] CONTROL CIRCUIT FOR VARYING THE INTENSITY OF FLASH LAMPS

[75] Inventors: Robert P. Bonazoli, Hamilton; Ellison H. Kirkhuff, Needham, both of Mass.

[73] Assignee: GTE Sylvania Incorporated, Danvers, Mass.

[22] Filed: Sept. 8, 1971

[21] Appl. No.: 178,628

[52] U.S. Cl. ......... 315/227, 315/200 A, 315/241 R, 340/25

[51] Int. Cl. .......... H05b 37/00

[58] Field of Search ........... 315/227, 241 P, 241 R, 315/100 D, 200 A; 340/25, 26, 28

[56] References Cited

UNITED STATES PATENTS 3,122,677 2/1964 Flieder .......................... 315/241 R 3,519,984 7/1970 Zychal .......................... 340/25

*Primary Examiner*—Roy Lake
*Assistant Examiner*—Lawrence J. Dahl
*Attorney*—Norman J. O'Malley

[57] ABSTRACT

In an airport runway flashing light beacon system the intensity of emission of individual xenon flash lamps is varied by shunting capacitative discharge from the flash lamp to a lower impedance, non-emissive discharge tube at the end of selected intervals after initiation of the flash discharge. The intensity of flash lamp emission is dependent on the interval of its discharge. This interval is varied by a one cycle multivibrator time delay circuit responsive to the initiation of flash lamp discharge to produce a trigger pulse for the discharge tube after an interval selected by one of several switchable resistors or capacitors in the time delay circuit.

17 Claims, 2 Drawing Figures

INVENTORS
ROBERT P. BONAZOLI
ELLISON H. KIRKHUFF
BY
James H. Grover
ATTORNEY

INVENTORS
ROBERT P. BONAZOLI
ELLISON H. KIRKHUFF
BY
James H. Grover
ATTORNEY

CONTROL CIRCUIT FOR VARYING THE INTENSITY OF FLASH LAMPS

BACKGROUND OF THE INVENTION

Standard airport approach lighting installations include steady burning runway edge lights and a series of flashing lamps or beacons aligned with the runway in advance of its threshold and operated successively so as to produce the effect of a ball of light travelling at high speed toward the runway. It has been customary to vary the intensity of the steady burning lights according to the visibility, but to operate the flash lamps at full intensity in poor visibility and turn them off in good visibility to avoid blinding an approaching pilot. It is desired to control flashing lamp intensity dependent on airport visibility conditions, but because they are gas (xenon) discharge devices their intensity is not easily controlled over the desired range from 100 percent to 1 percent of full intensity.

Controlling intensity by varying the voltage applied to flash lamps is limited by lamp characteristics to a range of 2 to 1, yielding an output candlepower range of 5:1, far short of the desired 100:1 range. In operation each flash lamp discharge is supplied from a high voltage (typically 2,000 volt) storage capaciter. Capacitors of different values might be switched to provide different stored charges, but would require bulky and expensive high current, high voltage switching devices subject to failure and welding of contacts. In photography it is also known to interrupt flash lamp discharge by shunting the storage capacitor current through a low impedance discharge tube so as to shorten the natural discharge time of the flash lamp storage capacitor and reduce the effective intensity of each flash. U.S. Pat. Nos. 3,033,988 and 3,350,603, for example, disclose a flash lamp printer circuit and a camera flash exposure circuit respectively, in which the emission of the flash lamp is photoelectrically measured and used to discharge a shunting quench tube and terminate lamp discharge. Such photographic flash control circuits involving photoelectric monitoring and feed back require an added photoelectric component. For example, whereas a pilot desires a low flash intensity at night, photoelectric feed back of reduced ambient light would tend to increase the flash intensity. On the other hand, while good visibility conditions might be sensed photoelectrically on the ground tending to reduce flash intensity, a pilot may be approaching the runway in fog and would require high flash intensity. In these examples dependence on photoelectric feedback interferes with the desired control of flash intensity. Because photoelectric flash circuits are dependent on the instantaneous flash lamp output, they are not adapted to control stepwise variation of the flash lamp between discrete, predetermined intensity levels.

Accordingly, the object of the present invention is to provide a control circuit for varying the intensity of a flash lamp substantially over the full range of lamp intensities in predetermined steps, which is independent on the instantaneous lamp output, and ambient light conditions, which avoids the use of photoelectric components, obviates the need for high current, high voltage switching devices, and which is compact and economical.

SUMMARY OF THE INVENTION

According to the invention an electronic circuit for controlling the discharge of stored current through a first, light emitting, discharge device and a second discharge device in shunt therewith comprises a time delay circuit having an input for connection to the first device and responsive to discharge therethrough to produce a trigger signal a predetermined interval after initiation of discharge, said delay circuit including a plurality of impedances selectively connectable in the delay circuit to vary the length of said interval stepwise, and means for applying the trigger signal to the second device and cause discharge thereof thereby to terminate discharge of the light emitting device, whereby the effective intensity of emission from the first device can be varied over substantially the full range of its intensities independently of its instantaneous emission.

DRAWING

DESCRIPTION

General

Figure 1:
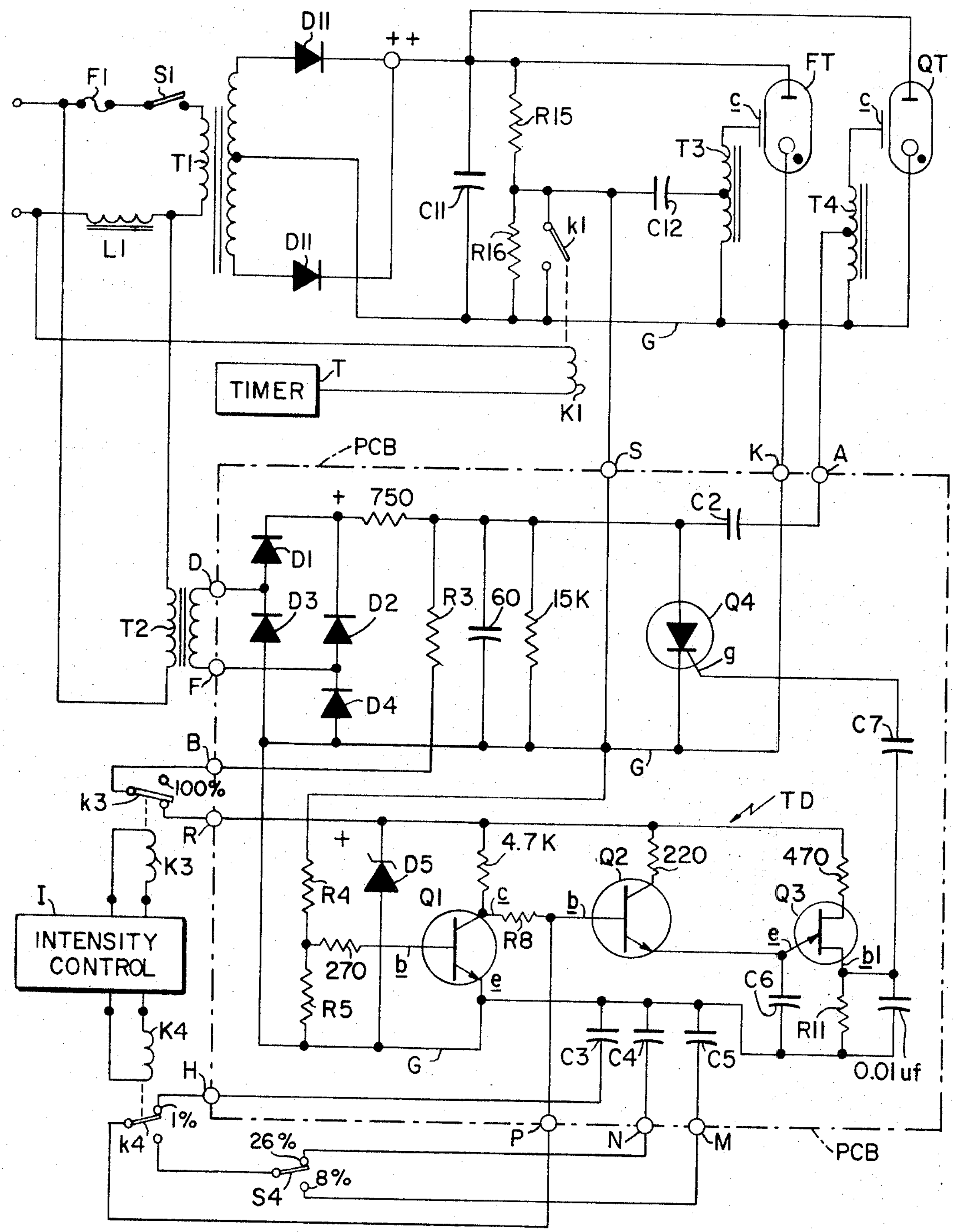
FIG. 1 is a schematic drawing of one form of flash lamp control circuit.

The dot-dash lines of FIG. 1 represent a printed circuit board PCB about 2 × 2½ × 3½ inches in dimension and weighing 2 to 3 ounces. Within the dot-dash lines is a preferred form of control circuit for varying the effective intensity of a flash lamp or tube FT shown in a high voltage circuit appearing above the PCB. The high voltage circuit, PCB, and relays K3 and K4 are installed in a housing which is one of a number of housings, e.g. eight, located in a series approaching an airport runway threshold. The series of flash lamp installations is under the control of a timer T which sequentially initiates the discharge of successively approaching lamps. The sequence repeats typically twice a second with an approximately 35 millisecond interval between flashes of successive lamps. An intensity control I, located near the threshold of the runway senses the current carried by steady burning runway edge lights, which current is remotely controlled from an airport control facility. As the edge light current is stepped between high, medium and low intensities, the intensity control I senses the steps and energizes the relays K3 and K4 so as to step the flash lamp FT through corresponding intensities.

FIG. 1 High Voltage Flash Lamp Circuit

Power at 240 volt, 60 herz is supplied through a fuse F1, manual On-Off switch S1 and a 75 millihenry choke L1 to the primary of a power transformer T1. The 2,700 volts at the center tap of the power transformer secondary is rectified by two 250 milliampere, 3 kilovolt diodes D11 to provide 2,000 volt direct current between the high voltage positive bus ++ and ground bus G for charging a 30 microfarad main storage capacitor C11. The flash lamp FT and a quench tube QT are connected in shunt across the storage capacitor and are non-conductive until triggered by a voltage signal applied to their respective controls *c*. The flash tube FT may be a xenon filled gas discharge device, Sylvania type R4335, with an impedance on discharge of 22 ohms and a light emission of 14,000 lumen seconds. The quench tube may be a 12 mm. OD Pyrex tube, with an arc length of 12 inches and a fill of argon at 130 torr. The impedance of the quench tube is preferably about one tenth that of the flash tube. Resistors R15 (1 megohm) and R16 (120 kilohms) divide the voltage to approximately 200 volts at their junction charging a secondary storage capacitor C12 to this voltage. When the timer T momentarily energizes a relay K1, its contact *k*1 allows the secondary capacitor C12 to discharge through an autotransformer T3 which steps up the ensuing voltage pulse to about 15 kilovolts as required to trigger the flash tube FT and initiate its discharge and light emission. Simultaneously the divider junction voltage, which is connected through the PCB terminal S to the base *b* of a transistor Q1, drops to the low ground voltage of Bus G.

FIG. 1 Printed Circuit Board PCB

The PCB is supplied from the 240 volt power terminals by a transformer T2 which steps down the 240 volt high voltage circuit power to 120 volts. The lower voltage is rectified by a bridge comprising diodes D1 to D4 inclusive and applied between a low voltage positive bus + and a ground bus G commonly connected through PCB terminal K with the high voltage circuit ground. The positive bus + is shown connected through a 15 kilohm resistor R3, PCB terminals B and R, and a relay contact *k*3 to a like positive bus + of a PCB time delay sub-circuit TD regulated by a type 2VR20 zener diode D5.

Transistors Q1 and Q2 (type 2N2222) of the PCB time delay sub-cirucit TD comprise a one cycle multivibrator or monostable flip flop. The first stage Q1 is normally held conducting by the positive voltage applied through input terminal S further divided by resistors R4 (1megohm) and R5 (100 kilohms). The second stage Q1 is normally held cut off by connection of its base *b* through a 470 ohm resistor R8 to the collector *c* of the first stage. When, at the initiation of the flash tube discharge the voltage at the PCB input S and at the base *b* of Q1 drops to ground, Q1 ceases to conduct and its collector voltage rises at an exponential rate determined by a time constant network comprising a 270 ohm resistor R8 and one of three capacitors C3 (0.001 microfarad), C4 (0.005 mf) or C5 (0.0033 mf) as selected by the intensity control relays K3 and K4 (described more fully hereafter). Concomitantly the second stage transistor Q2 starts conducting at a rate determined by resistor R9 (220 ohms) and capacitor C6 (0.047 mfd). Conduction of the second stage transistor Q2 continues until capacitor C6 is charged to the emitting switching voltage of a unijunction transistor (UJT) Q3 (type 2N4870). The time interval for reaching the UJT switching voltage is determined by the multivibrator time delay network and varies according to which of the three capacitors C3, C4 or C5 is selected. When the UJT is switched on, a sharp voltage pulse at its base *b*1 is transmitted through an 0.1 mf capacitor C7 to the gate *g* of a silicon controlled rectifier (SCR) Q4 (type 2N4443). The SCR Q4 is turned on abruptly and discharges at a 2 mf trigger capacitor C2 through the primary of the quench tube autotransformer T4. A high voltage pulse in the T4 secondary triggers the quench tube into conduction, thereby discharging the main high voltage storage capacitor C1 and abruptly extinguishing the flash lamp FT. This cycle for each lamp may be repeated at half second intervals.

FIG. 1-Intensity Control-Relays K3 and K4

As previously suggested the effective emission of the flash lamps is dependent upon the length of the interval between the initiation and quenching of flash lamp discharge, this interval being varied by selection of one of the capacitors C3, C4 or C5 in the multivibrator time delay network by the relays K3 and K4.

As an example, it is desired to vary the effective flash intensity stepwise from a high level of 100 percent of maximum intensity through a medium level of 26 or 8 percent, to a low level of 1 percent.

For the high level of flash intensity relay K3 is energized by the intensity control I transferring its contact *k*1 from the position shown in FIG. 1 to position 100 which disconnects the power supply from the positive bus + of the time delay circuit TD and disables the circuit TD. Consequently the quench tube QT will not be triggered and the flash tube FT will discharge the full charge of the main capacitor C11 and emit full intensity in about 150 milliseconds.

The intermediate intensity of 26 or 8 percent is initially selected by a manual switch S1, shown in FIG. 1 in the 26 percent position. With relay K3 de-energized and relay K4 energized the contact *k*4 is transferred from the position shown in FIG. 1 to the position connecting capacitor C4 to the base of transistor Q2, and providing a time delay of approximately 22 microseconds between initiation and quenching of flash lamp discharge. If switch S1 is in the 8 percent position, capacitor C5 is selected providing a time delay of approximately 16 microseconds.

For the lowest intensity level, 1 percent of maximum intensity, the intensity control I leaves both relays de-energized and their contacts as shown in FIG. 1 thus selecting capacitor C3 which provides a time delay of approximately 8 microseconds.

Thus in FIG. 1 the variably selected impedance of the time delay circuit TD which govern the flash lamp intensity are capacitors C3, C4 and C5. While stepwise charges of intensity of 1–8 percent or 26 percent are given as examples, the capacitors C3, C4, C5 may be of values providing steps from 1 to 100 percent of maximum intensity.

Figure 2:
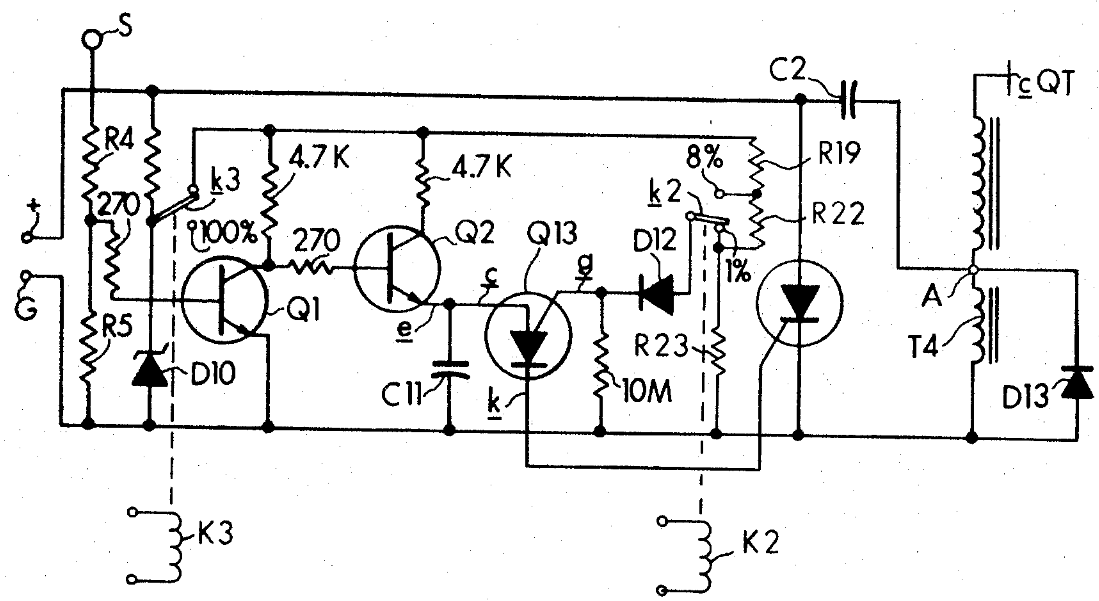
FIG. 2 is a schematic drawing of an alternate form of control circuit.

FIG. 2 Alternate Control Circuit

In FIG. 2 the variably selected impedances are resistors R19, R22 and R23 respectively 15, 9.1 and 22 kilohms. The time delay circuit of FIG. 2 is like that of FIG. 1 and has the same components except as noted below.

Transistors Q1 and Q2 comprise a monostable multivibrator which executes one cycle when the voltage applied through terminal S drops sharply at the initiation of flash lamp discharge. The resulting rising voltage at the emitter *e* of the second stage Q2 charges a capacitor C11 (0.047 mf) until the threshold voltage of a programmable unijunction transistor (PUT, General Electric type D13T) is reached. The threshold voltage is determined by the voltage dividers R19, R22 and R23. A selected voltage is applied through a diode D12 (1N4004) to the gate of the PUT Q13. This voltage is selected by operation of relay K4 by the intensity control I of FIG. 1. The values of the voltage divider resistor R19, R22 and R23 are selected such that the PUT threshold is reached, for example, after the time intervals described with respect to FIG. 1. After such time intervals the PUT conducts generating a trigger pulse which is applied through a capacitor C2 at the output of SCR Q4 to the trigger transformer T4 of the quench tube QT control *c*. A diode D13 (1N4004) permits rapid charging of the capacitor during transmission of the trigger pulse to the quench tube. Discharge of the quench tube QT terminates discharge of the flash tube FT when its intensity has reached the level of 1 or 8 percent of maximum preselected according to the contact positions of relay K4. For 100 percent intensity a relay K3, operated by the intensity control I as in FIG. 1, transfers its contact *k*3 to the 100 percent, disconnecting the positive bus + from the time delay circuit and preventing flashing of the quench tube QT so that the flash tube FT discharges the full charge of the main capacitor C11.

With the two exemplary forms of the invention it can be seen that the small and inexpensive components of the low voltage PCB time delay circuit are distinctly advantageous over high voltage, high current components in the flash tube circuit, and over photoelectric controls which depend on the flash lamp light output or light feedback. Whereas photoelectric circuits are notoriously subject to drift, the selectable capacitative and resistive impedances will vary only one or two percent over long periods (years) of time.

It should be understood that the present disclosure is for the purpose of illustration only and that this invention includes all modifications and equivalents falling within the scope of the appended claims.

We claim:

1. An electronic circuit for controlling the discharge of stored current through a first, light emitting, discharge device and a second discharge device in shunt therewith comprising:

a time delay circuit having an input for connection to the first device and responsive to discharge therethrough to produce a trigger signal a predetermined interval after initiation of discharge, said delay circuit including a plurality of impedances selectively connectable in the delay circuit to vary the length of said interval stepwise, output means for applying the trigger signal to the second device and cause discharge thereof thereby to terminate discharge of the light emitting device, and means connected to the impedances for switching selected impedances in said circuit, whereby the effective intensity of emission from the first device can be varied in predetermined values over substantially the full range of its intensities independently of its instantaneous emission.

2. A circuit according to claim 1 wherein said time delay circuit comprises a switching device having a control connected to said input, and responsive to a voltage change at said input to initiate current flow through a selected impedance.

3. A circuit according to claim 2 wherein said switching device comprises the first stage of a one cycle multivibrator with a changing voltage output.

4. A circuit according to claim 3 wherein said multivibrator includes a time constant network comprising said impedances.

5. A circuit according to claim 1 wherein said time delay circuit comprises a trigger device with a control causing transmission of the trigger signal when the voltage at said control crosses a threshold value at the trigger control, said impedances being coupled to said control to select said threshold value.

6. A circuit according to claim 2 wherein said time delay circuit comprises a trigger device connected to said multivibrator and having a control causing transmission of the trigger signal when the multivibrator voltage output crosses a threshold value at the trigger control.

7. A circuit according to claim 6 wherein said multivibrator includes a time constant network comprising said impedances.

8. A circuit according to claim 6 wherein said impedances are coupled to said control.

9. A circuit according to claim 1 wherein said impedances comprise capacitances.

10. A circuit according to claim 3 wherein said impedances comprise capacitances.

11. A circuit according to claim 1 wherein said impedances comprise resistances.

12. A circuit according to claim 5 wherein said impedances comprise resistances.

13. A circuit according to claim 1 wherein said light emitting discharge device comprises an airport beacon flash lamp.

14. An airport beacon flash lamp system comprising:

a high voltage main storage capacitor;

a gas discharge flash lamp and quench tube connected to the storage capacitor in a discharge circuit, each having a control for initiating discharge from the capacitor, discharge of the quench tube terminatin discharge of the flash lamp and limiting the effective intensity of the flash;

a low voltage, variable time delay circuit having an input connected to the discharge circuit, a plurality of impedances selectively connectable in the time delay circuit, a switching device having a control connected to the input and responsive to initiation of flash lamp discharge to initiate current flow through and a changing voltage at the selected impedance, a trigger device with a control coupled to the selected impedance and having a threshold response to the changing voltage to produce a trigger signal an interval after initiation of flash lamp discharge predetermined by the selected impedance;

means for applying the trigger signal to the quench tube control to discharge the quench tube and terminate flash lamp discharge; and an intensity control including relay means for connecting selected impedances in the time delay circuit thereby to vary the interval between flash lamp and quench tube discharge stepwise in predetermined lengths, whereby the effective intensity of flash lamp can be varied substantially over the full range of its intensities independently of its instantaneous emission.

15. A system according to claim 14 wherein said impedances are capacitative.

16. A system according to claim 14 wherein said impedances are resistive.

17. A system according to claim 14 wherein said intensity control includes addition relay means for disabling the time delay circuit from applying a trigger signal to the quench tube, thereby allowing the flash tube to emit full intensity.

* * * * *